Feb. 20, 1934.    W. J. GUILLE    1,948,031
SELF FEEDING FLOWERPOT
Filed Nov. 2, 1932    2 Sheets-Sheet 1

WALTER J. GUILLE,
INVENTOR.
BY Julian J Wittal
his ATTORNEYS.

Feb. 20, 1934.  W. J. GUILLE  1,948,031
SELF FEEDING FLOWERPOT
Filed Nov. 2, 1932  2 Sheets-Sheet 2

WALTER J. GUILLE,
INVENTOR.

BY Julian J. Wittal
his ATTORNEYS.

Patented Feb. 20, 1934

1,948,031

UNITED STATES PATENT OFFICE 1,948,031

SELF-FEEDING FLOWERPOT

Walter J. Guille, New York, N. Y.

Application November 2, 1932. Serial No. 640,789

9 Claims. (Cl. 47—38)

This invention relates to flower pots and like containers for plants and flowers, and has for its main object to provide a device of this character which will be self-feeding, that is in which a certain amount of water or other liquid nourishment for the plant may be stored and in a way automatically used by the flower or plant in said pot or container, according to its needs.

A further object of this invention is to provide a separate container of water or nourishing liquid in an efficient and simple manner in communication with the flower pot proper.

Another object of this invention is to provide a separate container as characterized hereinbefore, which will be an integral part or extension of the flower pot proper formed by portions of said pot.

Still another object of this invention is to provide a flower pot with a separate container for liquid nourishment adjacent to the bottom thereof, said flower pot and said container having legs to separate their bottoms from the supporting surface on which the pot is placed, said legs preferably being also integral with the bottoms of said pot and said container.

A further object of my invention also is to provide clamps adapted to hold the dirt or soil in my flower pot and the growing plants therein, and prevent their dislocation from said pot, said pot proper preferably having an integral frame formed around its upper edges to removably receive such clamps.

Other objects of this invention will be apparent as the specification of the same proceeds, and among others are: to provide a device of the character described which will be simple in construction, inexpensive to manufacture and attractive in appearance.

The above and additional objects are accomplished by such means as are illustrated in the accompanying drawings, described in the following specification and then more particularly pointed out in the claims.

With reference to the drawings, wherein I have illustrated the preferred embodiment of my invention as it is reduced to practice, and throughout the several views of which similar reference numerals designate corresponding parts:

Figure 1:
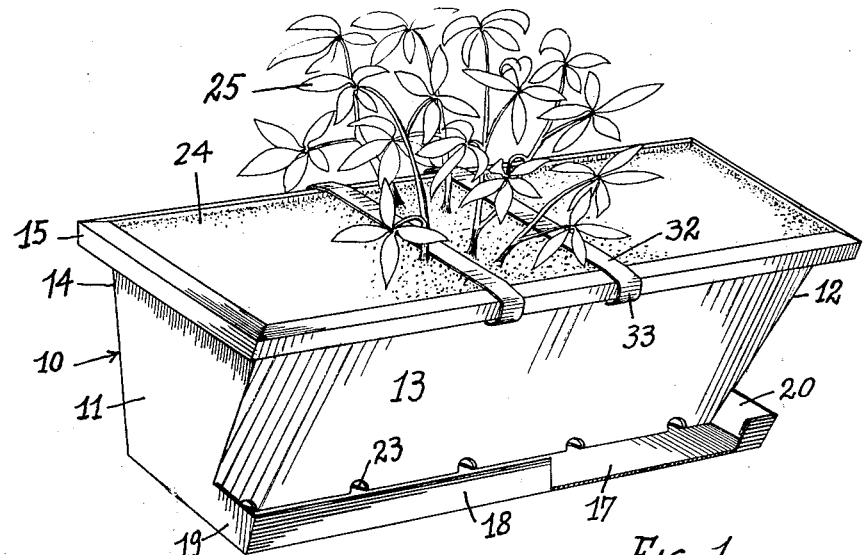
Fig. 1 is a perspective view of my novel flower pot showing the extension container, the removable clamps, and indicating the soil and plants in said pot.

Referring now to the drawings more in detail, and by characters of reference, the numeral 10 indicates my flower pot in general, having the outwardly widening left hand side 11, right hand side 12, front 13, rear 14 with a downwardly curved frame 15 around the upper edges of said sides, preferably formed integral therewith.

My flower pot also shows a bottom 16 and said bottom has a forward extension which is bent upwardly, as at 18, meeting and being secured at the two sides thereof to the extensions 19 and 20 of the left hand and right hand sides 11 and 12, respectively, and so forming a comparatively low walled extension container 21 at the front side of the flower pot proper 22 adjacent to the bottom portion thereof. The front wall 13 of the pot proper 22 may have apertures 23 provided at the lower end thereof so that communication is established between the space in the flower pot proper 22 and the extension container 21 through said apertures 23.

In use, the flower pot proper 22 is filled with the desired amount of soil 24 and plants or flowers 25 may be planted therein in the usual manner, while water or other liquid nourishment may be poured into the extension container 21 and gradually absorbed by capillary action by the plant and the soil in the flower pot proper 22 through the apertures 23. In this manner, my novel flower pot assures that the plant therein will get just the necessary amount of nourishment and will get it automatically all the time. In a reverse manner, the water may be poured over the top of the soil 24 in the flower pot, and the superfluous amount of water may percolate through the soil and into the extension or reserve container 21.

Figures 4, 5:
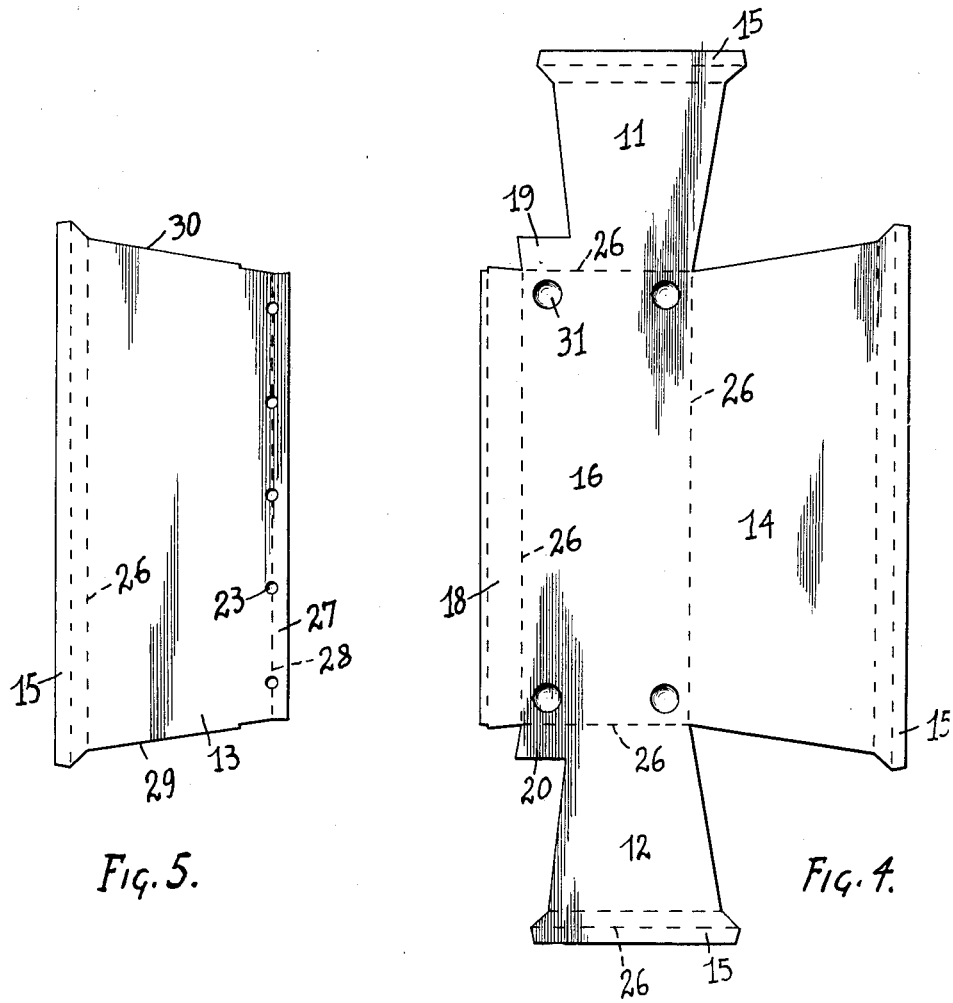
Figs. 4 and 5 are plan views of the sheet metal blanks from which the preferred form of the pot may be manufactured.

The blanks for the preferred form of my novel flower pot are shown in Figs. 4 and 5, and in said preferred embodiment my flower pot may be formed of two pieces of sheet metal, as shown in said figures, the portion of said sheet metal blank to be used for the bottom 16 showing the extensions for the sides 11 and 12 and the rear 14, each such extension being outwardly widening to provide for the prismatic shape of the completed flower pot, and also indicating the extensions 15 at the ends of the sides for the frame 15 mentioned hereinbefore and the extensions 18, 19 and 20 from which to form the reserve container 21, the parts of said blank being bent along the dotted lines 26 and so providing the final shape indicated in Fig. 1, as will be obvious.

Figures 2, 7, 8:
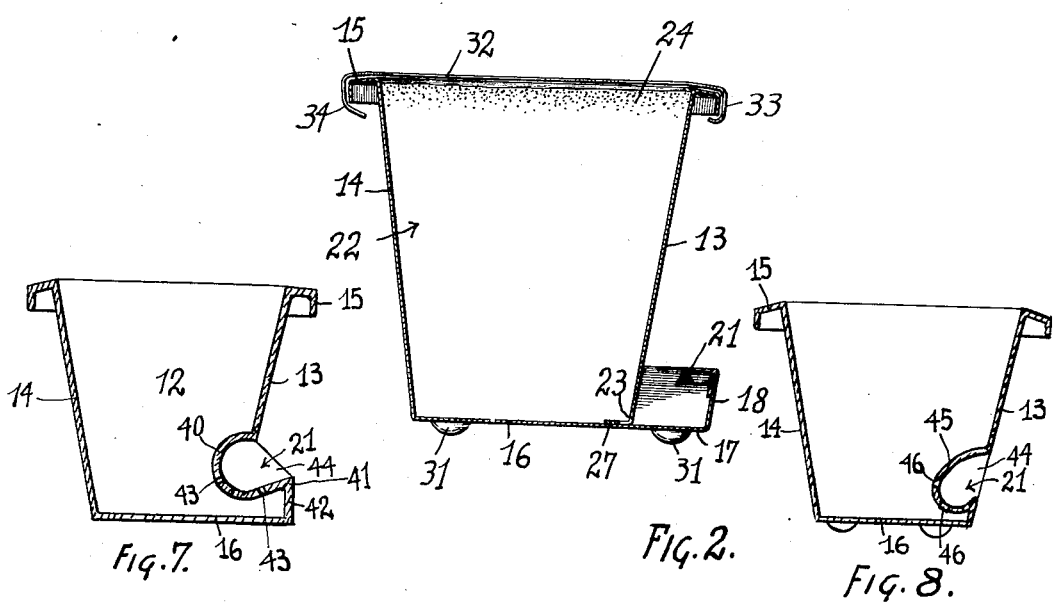
Fig. 2 is a cross-sectional elevation of the device shown in Fig. 1.
Fig. 7 and 8 are cross sectional views of modifications of my novel flower pot.
Figure 3:
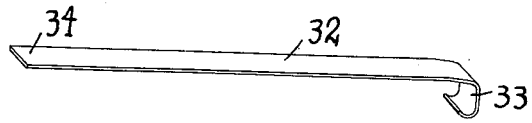
Fig. 3 is a perspective view of the preferred form of said removable clamps before being applied to the pot.

The separate piece of blank shown in Fig. 5 is that of the front side 13 showing the extension and folding lines for the frame 15 at the upper end thereof, and another extension 27 with a folding line 28 at the lower end of the same, which extension after being bent laterally to its side may be welded to the bottom 16, as indicated in Fig. 2, while side edges 29 and 30 of the blank for the front 13 may be welded to the respective edges of the left hand and right hand sides 11 and 12 respectively, whereby the final attractive and efficient form of my novel flower pot is produced by a simple and inexpensive method.

Legs 31 may also be provided for my novel flower pot, the simplest means thereof being shown in the drawings and consisting in pressing out semi-globular projections from the bottom of the flower pot proper and of the extension container, respectively. Such legs will prevent direct contact between the bottom of my flower pot and the support on which it rests and provide a free ventilating space therebetween so that the pot cannot get rusty or otherwise deteriorate, while the supporting surface will also be protected against dampness, and the harmful effect thereof.

On account of the constant wetness of the soil 24 in my improved flower pot, the same is apt to be dislocated or to drop out from the flower pot in an even easier manner than it is the case with the ordinary flower pots where such dislocation also frequently happens, and is quite troublesome. To prevent such dislocation or dropping out, of the soil 24, when shipping or while in transit I employ the clamps 32 which, in the preferred embodiment shown, are simply strips of sheet metal placed across the top of the flower pot and removably hooked underneath the frame 15. In practice, I found it the most efficient to provide such clamps of pliable material, the one end 33 of the same being provided with a ready hook to be hooked underneath the frame 15 at the one side of the flower pot and the other end 34 of the clamp may be bent and hooked in underneath the frame 15 at the opposite side of the flower pot, with a tightness as necessary. When it is desired to remove the clamp, the end 34 thereof will be bent in a reverse manner and so unhooked from the frame 15.

On account of the rich and continuous nourishment received by the plants 25 in my novel flower pot, such plants are apt to grow in a quicker manner than usual and their roots may cause them to be projected upwardly from the usual flower pot, and the said clamps 32 are highly useful for the added object of keeping said plants down within the flower pot or container.

Figure 6:
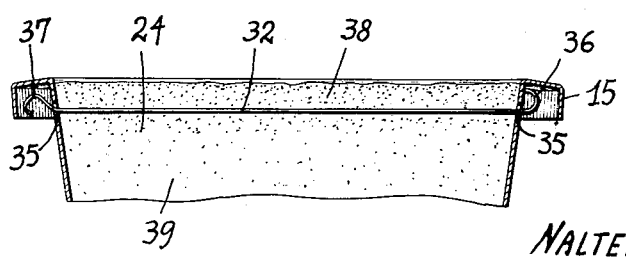
Fig. 6 is a fragmentary sectional elevation of the top portion of my flower pot showing a modification of the removable clamps used therewith.

A modified form of my securing clamp 32 is shown in Fig. 6 in which the same is passed through slots 35 adjacent to the top of two opposite sides of the flower pot and its ends 36 and 37 bent either upwardly underneath the frame 15 to be hidden thereby, or downwardly for easier manipulation. When it is desired to remove such a clamp, the ends thereof will be straightened out and the same pulled through the slots 35 in a horizontal direction. In the modification of Fig. 6, the clamp 32 may be hidden by the upper portion 38 of the soil or moss 24 in the flower pot, and if necessary, such upper portion 38 may be secured by any suitable method, as by pins or nails being driven therethrough, into the secured portion 39 of the soil 24.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various changes in details of construction, proportion and arrangement of parts may be resorted to, when required, without sacrificing any of the advantages of my invention, as set forth and defined in the appended claims.

Two such additional modifications or changes are shown in Figs. 7 and 8, respectively, each such figure being a cross sectional elevation of the modified form of my flower pot and being somewhat diagrammatical.

The modification shown in Fig. 7 also has the front wall 13, rear wall 14, frame 15 and bottom 16, while the right hand sidewall 12 of the same only is indicated in the figure, but the reserve container 21 is not a simple extension or addition to the bottom portion of my device, but the same is formed by a curved portion 40 of the front wall 13 near the bottom of the pot, the front part 41 thereof projecting beyond the front side 13 and resting on a bottom front wall 42. It will be seen that in this arrangement a portion of the reservoir or container 21 is built within and projecting into the inner space of the flower pot proper, and the same in this case also may show openings 43 providing communication between the inside of the flower pot proper and the space in the reservoir 21. It is obvious that in this case also water or other liquid nourishment may be placed into the reservoir 21. The two sides of said reservoir may be completed and closed by side walls 44, preferably portions of the respective side walls 11 and 12.

In the modification of Fig. 8, the reservoir 21 is again formed by a curved portion 45 of the front wall 13 and communicates with the inside of the flower pot proper through the holes or openings 46, the only difference against the modification of Fig. 7 being that the entire reservoir is built within the space of the flower pot proper.

What I claim as new, is:

1. In a flower pot having front, rear and side walls, a bottom and being open at the top, a frame around the upper end of said walls forming a downwardly open channel therewith; a reserve container being integral with said pot and communicating therewith, and clamps to bridge the upper opening in the pot, the ends of said clamps being adapted to engage said channel and being secured thereby.

2. In a flower pot as set forth in claim 1, said walls and said bottom being permanently fastened together.

3. In a flower pot as set forth in claim 1, said side walls and said bottom being formed of one integral piece of sheet material.

4. In a flower pot as set forth in claim 1, said reserve container being formed by an inward bend in one of the said walls.

5. In a flower pot as set forth in claim 1, said reserve container being formed by an extension of the bottom of said pot.

6. In a flower pot as set forth in claim 1, opposite pairs formed by some of said walls and slots in the upper portions of two opposite walls adapted to pass said clamp therethrough.

7. In a flower pot as set forth in claim 1, one end of each of said clamps having a permanent hook formed therein while the other end being of pliable material and adapted to form a second hook therewith.

8. In a flower pot of the class described having front, rear and side walls and an opening top, clamps to secure the soil in the pot, said clamps being in the form of strips of material adapted to bridge the open top of the pot, and each of said clamps having a permanent hook formed at the one end thereof, while the other end is made of pliable material adapted to form a suitable hook therewith, opposite pairs formed by some of said walls and said hooks engaging the upper portions of two opposite walls of the pot.

9. In a flower pot of the class described, a reserve container being made integral with said pot and communicating therewith, said container being formed as a portion of one of the walls.

WALTER J. GUILLE.